(12) United States Patent
Gunturu et al.

(10) Patent No.: US 12,301,411 B2
(45) Date of Patent: May 13, 2025

(54) SYSTEM AND METHOD FOR ZERO TRUST ORCHESTRATION OF AN EDGE GATEWAY WITHIN A CLOUD OR MULTI-CLOUD NETWORK

(71) Applicant: Aviatrix Systems, Inc., Santa Clara, CA (US)

(72) Inventors: Purnima Gunturu, Cupertino, CA (US); Praveen Vannarath, Sunnyvale, CA (US)

(73) Assignee: Aviatrix Systems, Inc., Santa Clara, CA (US)

( * ) Notice: Subject to any disclaimer, the term of this patent is extended or adjusted under 35 U.S.C. 154(b) by 0 days.

(21) Appl. No.: 17/985,819

(22) Filed: Nov. 12, 2022

(65) Prior Publication Data

US 2024/0163162 A1 May 16, 2024

(51) Int. Cl.
*H04L 41/0803* (2022.01)
*H04L 12/46* (2006.01)
*H04L 41/22* (2022.01)

(52) U.S. Cl.
CPC ...... *H04L 41/0803* (2013.01); *H04L 12/4641* (2013.01); *H04L 41/22* (2013.01)

(58) Field of Classification Search
CPC .. H04L 41/0803; H04L 41/22; H04L 12/4641
See application file for complete search history.

(56) References Cited

U.S. PATENT DOCUMENTS

| | | | |
|---|---|---|---|
| 10,135,789 B2 * | 11/2018 | Mayya | H04L 45/42 |
| 11,496,461 B2 * | 11/2022 | Gupta | H04L 63/20 |
| 2009/0307685 A1 * | 12/2009 | Axnix | G06F 8/60 |
| | | | 717/174 |
| 2021/0184936 A1 * | 6/2021 | Mutnuru | H04L 45/64 |
| 2021/0218598 A1 * | 7/2021 | Ganapathy | H04L 45/64 |
| 2022/0006839 A1 * | 1/2022 | Douglas | H04L 41/0869 |

FOREIGN PATENT DOCUMENTS

CA 2736956 A1 * 6/2012

OTHER PUBLICATIONS

Wu, Y. English translation of CN-115189897-A. (Year: 2022).*

(Continued)

*Primary Examiner* — John M Macilwinen
(74) *Attorney, Agent, or Firm* — Winstead PC

(57) ABSTRACT

An edge gateway deployed within an overlay network interconnecting a first public cloud network with an on-premises network is described. Coupled to a controller, the edge gateway is configured to receive a configuration file and attestation data from a controller, analyze the configuration file to obtain at least a first network address being used as an interface for secure communications with the controller, establish a secure interconnect with the controller based on the attestation data, and conduct a provisioning operation to initiate a request to the controller for edge gateway software thereby automated provisioning the edge gateway without human intervention. The edge gateway experiences automated provisioning based on a configuration file and attestation data upload.

26 Claims, 10 Drawing Sheets

(56) References Cited

OTHER PUBLICATIONS

DeCusatis, Casimer, et al. "Implementing zero trust cloud networks with transport access control and first packet authentication." 2016 IEEE International Conference on Smart Cloud (SmartCloud). IEEE. (Year: 2016).*

Demchenko, Yuri, et al. "Enabling automated network services provisioning for cloud based applications using zero touch provisioning." 2015 IEEE/ACM 8th International Conference on Utility and Cloud Computing (UCC). IEEE. (Year: 2015).*

Syed, Naeem Firdous, et al. "Zero trust architecture (zta): A comprehensive survey." IEEE Access 10: 57143-57179. (Year: 2022).*

Hoogendoorn, I. "Multi-Site Network and Security Services with NSX-T: Implement Network Security, Stateful Services, and Operations". apress. (Year: 2021).*

\* cited by examiner

SYSTEM AND METHOD FOR ZERO TRUST ORCHESTRATION OF AN EDGE GATEWAY WITHIN A CLOUD OR MULTI-CLOUD NETWORK

FIELD

Embodiments of the disclosure relate to the field of networking, virtualization and security. More specifically, one embodiment of the disclosure relates to an automated system designed to implement a secure connectivity and deployment model in a virtual environment that features edge devices that are authorized, authenticated, and periodically validated before undergoing provisioning and before access to cloud resources is granted.

GENERAL BACKGROUND

Over the past few years, cloud computing has provided an Infrastructure as a Service (IaaS), where resources are provided as part of a public cloud network and made accessible as a service to customers (e.g., companies, organizations, individuals, agencies, etc.) as well as the persons associated with these organizations such as network administrators, employees, contractors, or the like (hereinafter, "users"). One of these services allows users to run software components (e.g., software instances such as virtual clients and/or virtual servers) within the public cloud network. Hence, the migration of software functionality into the public cloud network has led to greater usage of virtual private cloud networks.

A virtual private cloud network is a collection of software components operating as an on-demand, configurable pool of resources, including resources allocated from the public cloud network for providing a certain level of isolation between different users. The isolation between different customers of the same public cloud network may be achieved through access controls and allocation of the virtual (software) components on a per customer basis. For example, Amazon® Web Services (AWS) provides for the purchase of Amazon® Elastic Compute Cloud (EC2) services, which provide dedicated data processing capabilities for the purchasing customer.

Previously, hardware appliances were deployed within a datacenter in order to provide connectivity between instances operating within a public cloud network and resources operating within the datacenter. In particular, one type of hardware appliance is deployed at the network edge of the data center, which handles the routing of egress/ingress communications from/to the datacenter. As a result, the hardware appliance had to be preloaded with proprietary software, shipped to the customer location and configured by administrators of the datacenter, unlike the virtual gateways implemented as part of one or more virtual private cloud networks that are directly accessible by a controller using a public IP address assigned to that virtual gateway.

This manual deployment is problematic because human administrators provisioning and configuring hardware appliances are more prone to error than orchestrating through an automated deployment scheme. Also, the manual deployment hampers scalability of the cloud platform.

The gateway device traditionally uses a username/password or building in the private key in the software for authenticating and authorizing with the controller to register itself prior to providing the network capability. This creates a security loophole as transporting the password/keys between controller to the edge virtual device is not foolproof.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
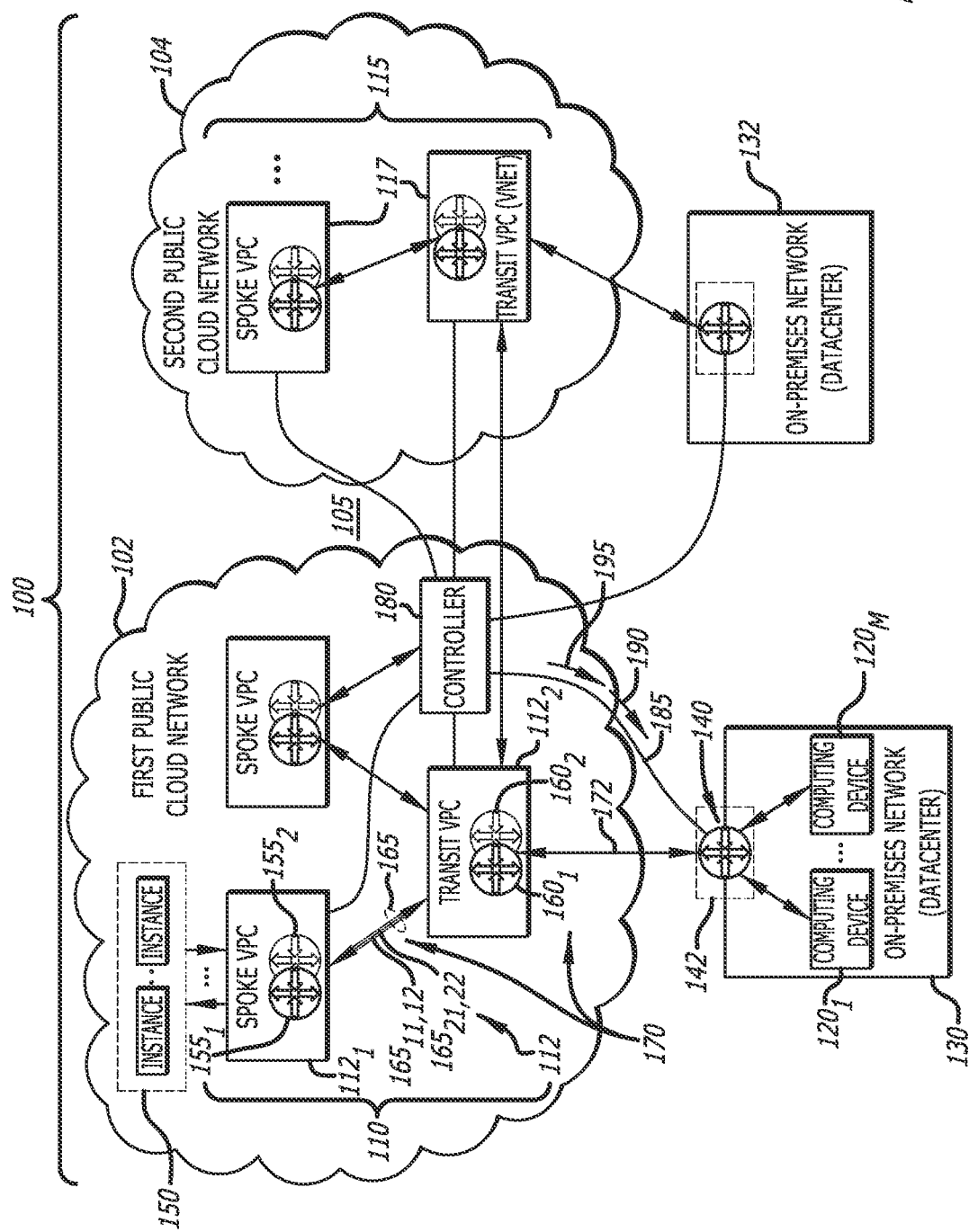
FIG. 1 is an exemplary embodiment of a multi-cloud architecture featuring multiple virtual private cloud networks in communications with one or more datacenters each including an edge gateway that supports connectivity over data, control and management planes.

Embodiments of a system and method for automating the orchestration of an edge gateway deployed within or operating in concert with a datacenter, namely an on-premises network or a co-location facility, are described herein. According to one embodiment of the disclosure, the edge gateway may be configured as a virtual device such as a software instance operating to establish and maintain a secure interconnect between one or more computing devices (hereinafter, "computing device(s)") within the datacenter and one or more network resources (hereinafter, "network resource(s)") as well as control a flow of messages therebetween. A "network resource" may be a gateway operating as part of a public cloud network such as, for example, a transit gateway deployed within a virtual public cloud network that is in communication with the datacenter. As an alternative embodiment of the disclosure, the edge gateway may be configured, at least in part, as a physical (hardware) device deployed within the datacenter and responsible for establishing the secure interconnect as described above.

For this embodiment of the disclosure, the edge gateway is communicatively coupled to (i) a cloud-based controller via a first (management) interconnect, (ii) one or more computing devices deployed within a local (on-premises) network via at least a second (or multiple) multiple local area network (LAN) interconnects, and (iii) at least one (transit) gateway deployed within a virtual private (transit) cloud network of an overlay network communicatively coupled to a public cloud network via at least a third (WAN) interconnects. In particular, via the first interconnect, the controller is now able to instantiate, provision, update, and conduct diagnostics of the operability of the edge gateway over two-way mutually trusted secure channel. The provisioning may be accomplished through any of a plurality of Zero Trust Orchestration (ZTO) schemes described below. Each of these ZTO schemes is designed to implement a secure connectivity model where an edge gateway is authorized, authenticated, and validated before orchestrating and granting access to a network resource for retrieval or upload of information (e.g., data, software, etc.) in a cloud platform.

It is contemplated that each edge gateway may be deployed as part of a datacenter and configured to establish communications with a cloud platform featuring a single cloud network or featuring multi-cloud network that includes at least two different types of public cloud networks (e.g., AWS™, Azure®, etc.). Hence, the edge gateway may be communicatively coupled to one or more transit gateways in different public cloud networks and computing devices within the datacenter.

I. Terminology

In the following description, certain terminology is used to describe features of the invention. In certain situations, the terms "logic," "component," and "device" are representative of hardware, software or a combination thereof, which is configured to perform one or more functions. As hardware, the logic (or component or device) may include circuitry having data processing or storage functionality. Examples of such circuitry may include, but are not limited or restricted to a processor (e.g., a microprocessor, one or more processor cores, a programmable gate array, a microcontroller, an application specific integrated circuit, or other data processing component), wireless receiver, transmitter and/or transceiver circuitry, semiconductor memory, or combinatorial logic.

Alternatively, or in combination with the hardware circuitry described above, the logic (or component or device) may be software in the form of one or more software modules. The software module(s) may include an executable application, an application programming interface (API), a subroutine, a function, a procedure, an applet, a servlet, a routine, source code, a shared library/dynamic load library, or one or more instructions. The software module(s) may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device.

The term "computerized" generally represents operations conducted by hardware in combination with software.

A "controller" is generally defined as a component that is configured to provision and manage operability of cloud components within one or more virtual private cloud networks (VPCs) deployed within a cloud network, which may include a single public cloud network or a multi-cloud network spanning across two or more public cloud networks. The provisioning and managing of the cloud components may include, inter alia, installing policies and/or rules utilized by the edge gateway that control network traffic between components and provide enhanced security to the cloud network.

The term "computing device" generally represents virtual or physical logic with data processing, filtering, and/or data storage functionality. Herein, a "gateway" is a type of computing device, where each gateway is configured to control communications between a source device and a destination device. For example, a gateway may correspond to virtual logic in the form of a software component that manages a flow of messages over one or more interconnects established between a datacenter and a cloud resource. The flow management may involve filtering, blocking, selected throughput rates, or the like.

Although having similar architectures, the gateways may be identified differently based on their location/operability within the cloud platform. For instance, a "spoke" gateway is a gateway configured to interact with stored cloud resources (e.g., software instances, etc.). Different from a spoke gateway, a "transit" gateway is configured to further assist in the propagation of network traffic (e.g., one or more messages) from/to a spoke gateway within a spoke VPC or from/to a computing device within the on-premises network.

As an illustrative example, each of the gateways operates, at least in part, as a data transfer component for virtual private cloud networks, and each gateway is configured and managed by the controller through a management interconnect. The gateway may be assigned an Internet Protocol (IP) address within an IP address range associated with a virtual private cloud network including the gateway. This IP address may constitute a Private IP address. As described below, the gateways may enable the transfer of network traffic from/to computing devices within the datacenter and instances within these virtual private cloud networks. Alternatively, in some embodiments, the gateway may correspond to physical logic, such as an electronic device that is communicatively coupled to the network and accessible via a hardware (MAC) address and the IP address.

The term "message" generally refers to information in a prescribed format and transmitted in accordance with a suitable delivery protocol. Hence, each message may be in the form of one or more packets, frames, a portion of the data traffic, or any other series of bits having the prescribed format.

The terms "interconnect" and "link" may be construed as a physical or logical communication path between two or more electronic devices. For instance, as a physical communication path, wired and/or wireless interconnects (or links) may be provided in the form of electrical wiring, optical fiber, cable, bus trace, or a wireless channel using infrared, radio frequency (RF), may be used. As a logical communication path, the interconnect (or link) may constitute an interface such as an Application Programming Interface (API) or other software-defined communication scheme.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. General Architecture

Referring to FIG. 1, an exemplary embodiment of a cloud platform 100, featuring multiple virtual network infrastructures 110 and 115 operating as part of an overlay network 105, is shown. The virtual network infrastructures 110 and 115 are configured for establishing and maintaining interconnects between cloud resources and computing devices operating within an on-premises network 130 or 132 operating as a datacenter. The virtual network infrastructures 110 and 115 may be deployed communicatively coupled to a single public cloud network or multiple public cloud networks as shown. More specifically, each of the virtual network infrastructures 110/115 may be implemented as part of a first public cloud network 102 such as an Amazon® Web Services (AWS) public cloud network. Alternatively, each of the virtual network infrastructures 110/115 may be implemented as part of a second public cloud network 104 such as Google® Cloud network and/or Microsoft® Azure® public cloud network for example. As yet another alternative, as shown, the first virtual network infrastructure 110 may be implemented as part of the first public cloud network 102 while the second network infrastructure 115 may be implemented as part of the second public cloud network 104.

Stated differently, the cloud platform 100 may be implemented as an overlay network for (i) single public cloud network (e.g., AWS™, Google® Cloud, Azure®, etc.) with the virtual network infrastructures 110/115 associated with the same public cloud network or (ii) a multi-cloud network with the virtual network infrastructures 110/115 associated with different cloud networks (e.g., AWS™ and Azure®). Herein, for clarity, each of the virtual network infrastructures 110/115 may include one or more virtual private cloud networks 112/117, each is referenced as a "VPC," independent of the type of public cloud network.

Referring still to FIG. 1, as an illustrative embodiment, the first VPC 112 may be communicatively coupled to one or more computing devices $120_1$-$120_M$ (M≥1) within a datacenter 130. Herein, the datacenter 130 may constitute an on-premises network, where an edge gateway 140 operates as an intermediary between the computing device(s) $120_1$-$120_M$ operating within the datacenter 130 and resources 150 operating within the one or more of public cloud networks 102 and/or 104. Herein, the edge gateway 140 may correspond to a single edge gateway or may correspond to multiple (e.g., two or more) edge gateways in which one edge gateway operates as a primary edge gateway (placed in active mode) and the other edge gateway operates as a redundant edge gateway (placed in standby mode). The resources 150 may include one or more cloud instances or cloud data storage in communication with or accessible by the spoke gateways $155_1$-$155_2$.

Each of the VPCs 112/117 includes one or more gateways, which are similar in architecture, but some of these VPCs may be identified differently based on their location/operability within the cloud platform 100. For instance, the first virtual network infrastructure 110 may include a first VPC $112_1$ and a second VPC $112_2$. The first VPC $112_1$, referred to as a "spoke VPC," is configured to maintain the resources 150 accessible by a set of (e.g., two or more) spoke gateways $155_1$-$155_R$ (R≥1) deployed within the first VPC $112_1$. As shown, the set of gateways $155_1$-$155_R$ include a first gateway $155_1$ and a second gateway $155_2$. Furthermore, the second VPC $112_2$, referred to as a "transit VPC," is configured to further assist in the propagation of network traffic (e.g., one or more messages) directed to one of the spoke gateways $155_1$ or $155_2$ or directed to one of the computing devices $120_1$-$120_M$ within the datacenter 130.

As further shown in FIG. 1, each of the spoke gateways $155_1$-$155_2$ is communicatively coupled (i.e., direct or indirect connection) to a set of gateways $160_1$-$160_S$ (S≥2) within the transit VPC $112_2$ (illustrated as "transit gateways" $160_1$-$160_2$, where S=2). These transit gateways $160_1$-$160_2$ operate as an intermediary between the spoke VPC $112_1$ and the datacenter 130 to support multiple egress/ingress paths. These paths are at least partially formed by one or more interconnects 170 established between the transit VPC $112_2$ and the datacenter 130 along with one or more active communication links 165 formed between the spoke VPC $112_1$ and the transit VPC $112_2$, which are described in U.S. Pat. No. 11,388,227 issued on Jul. 12, 2022, the entire contents of which are incorporated by reference herein.

Referring still to FIG. 1, the edge gateway 140 is configured to establish an interconnect 172 that overlays a network wide area network (WAN) connection extending between the datacenter 130 and the transit VPC $112_2$. More specifically, the interconnect 172 is arranged to support secure communications between the edge gateway 140 associated with the datacenter 130 and one or more of the transit gateways $160_1$-$160_2$ of the transit VPC $112_2$. As an illustrative example, the interconnect 172 may be coupled to and implemented as part of a high-speed connection such as an AWS Direct Connect link or Microsoft® Azure® Express Route link for example. This provides each of the computing devices $120_1$-$120_M$, deployed within the datacenter 130, with high-speed connectivity to (i) cloud resources residing within the first public cloud network 102 and/or (ii) cloud resources residing within the second public cloud network 104 via communications over the interconnect 172, one of the transit gateways $160_1$ or $160_2$, and a counterpart transit gateway within the second public cloud network 104.

According to one embodiment of the disclosure, the communication links 165 operate as operate as cryptographically secure tunnels, such as tunnels operating in accordance with a secure network protocol. One illustrative example of a secure network protocol may include, but is not limited or restricted to Internet Protocol Security (IPSec). Hence, in accordance with this illustrative example, the cryptographically secure tunnels 165 operate as IPSec tunnels, which are established between the spoke gateways $155_1$-$155_2$ and the transit gateways $160_1$-$160_2$.

More specifically, as shown in FIG. 1, the communication links 165 include multiple peer-to-peer communication links $165_{11}$-$165_{22}$. Each of the peer-to-peer communication links $165_{11}$-$165_{22}$ is dedicated to different spoke-transit gateway communication path. For example, a first communication link $165_{11}$ supports communications between the spoke gateway $155_1$ and the transit gateway $160_1$ while a second communication link $165_{12}$ supports spoke gateway $155_1$ to transit gateway $160_2$ communications. Similarly, a third communication link $165_{21}$ supports communications between the spoke gateway $155_2$ and the transit gateway $160_1$ while a fourth communication link $165_{22}$ supports spoke gateway $155_2$ to transit gateway $160_2$ communications. Collectively, the communication links $165_{11}$-$165_{22}$ support message flow based on management information received from a cloud-based controller 180 via a management interconnect 185.

The cloud-based controller 180 is configured to generate the edge gateway 140 and establish the secure, management interconnect 185 with the edge gateway 140. According to one embodiment of the disclosure, the edge gateway 140 is associated with a compute device 142 operating at a customer's datacenter (e.g., datacenter 130), where the compute device 142 may correspond to a virtual machine created and supported by a hypervisor (not shown) associated with the datacenter 130. The management interconnect 185 constitutes a secure communication path, operating in accordance with a secure network protocol (e.g., Secure Shell "SSH" protocol), between the controller 180 and the edge gateway 140.

Figure 2:
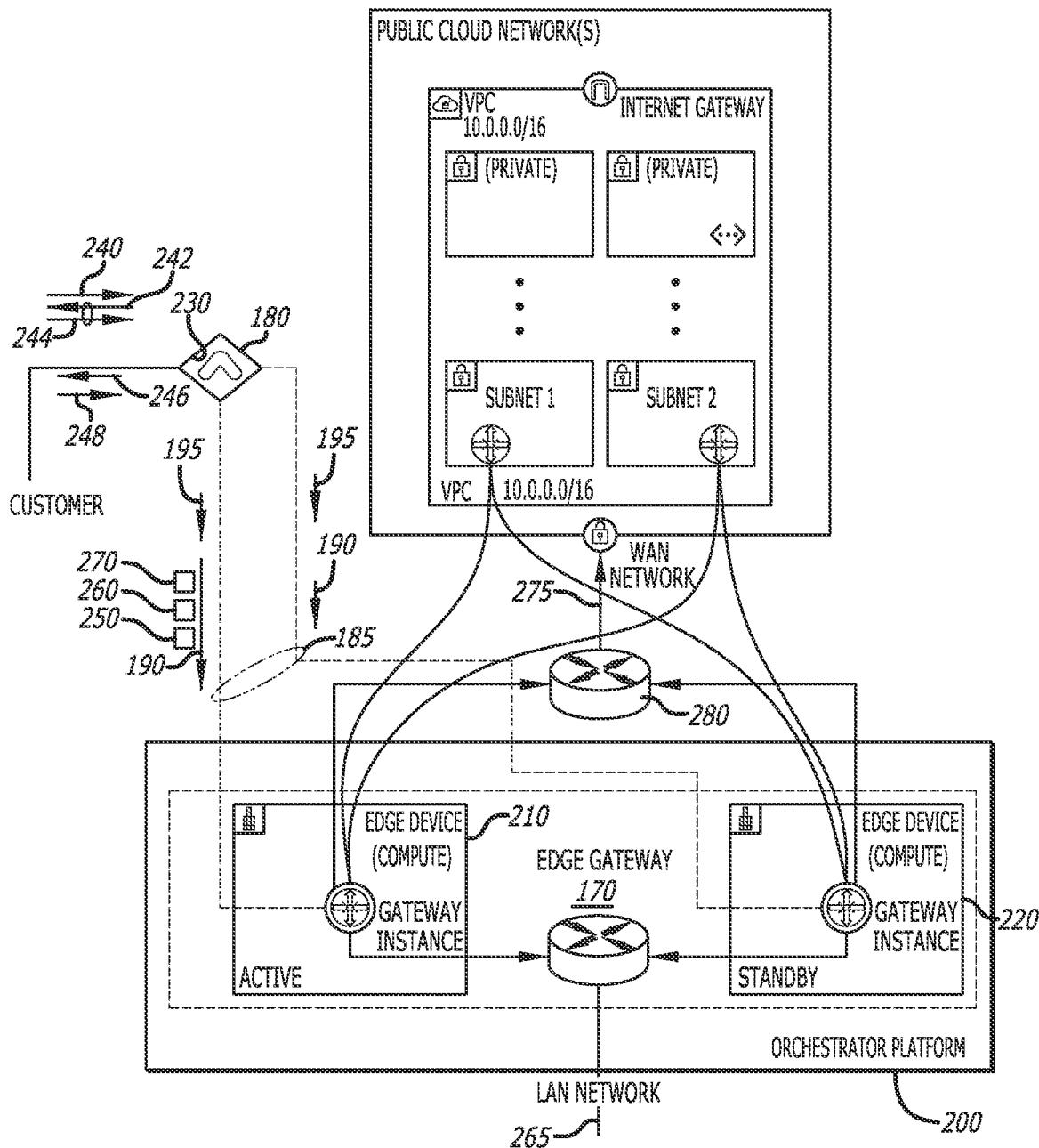
FIG. 2 is an exemplary embodiment of an orchestrator platform including the edge gateway of FIG. 1.
Figure 3A:
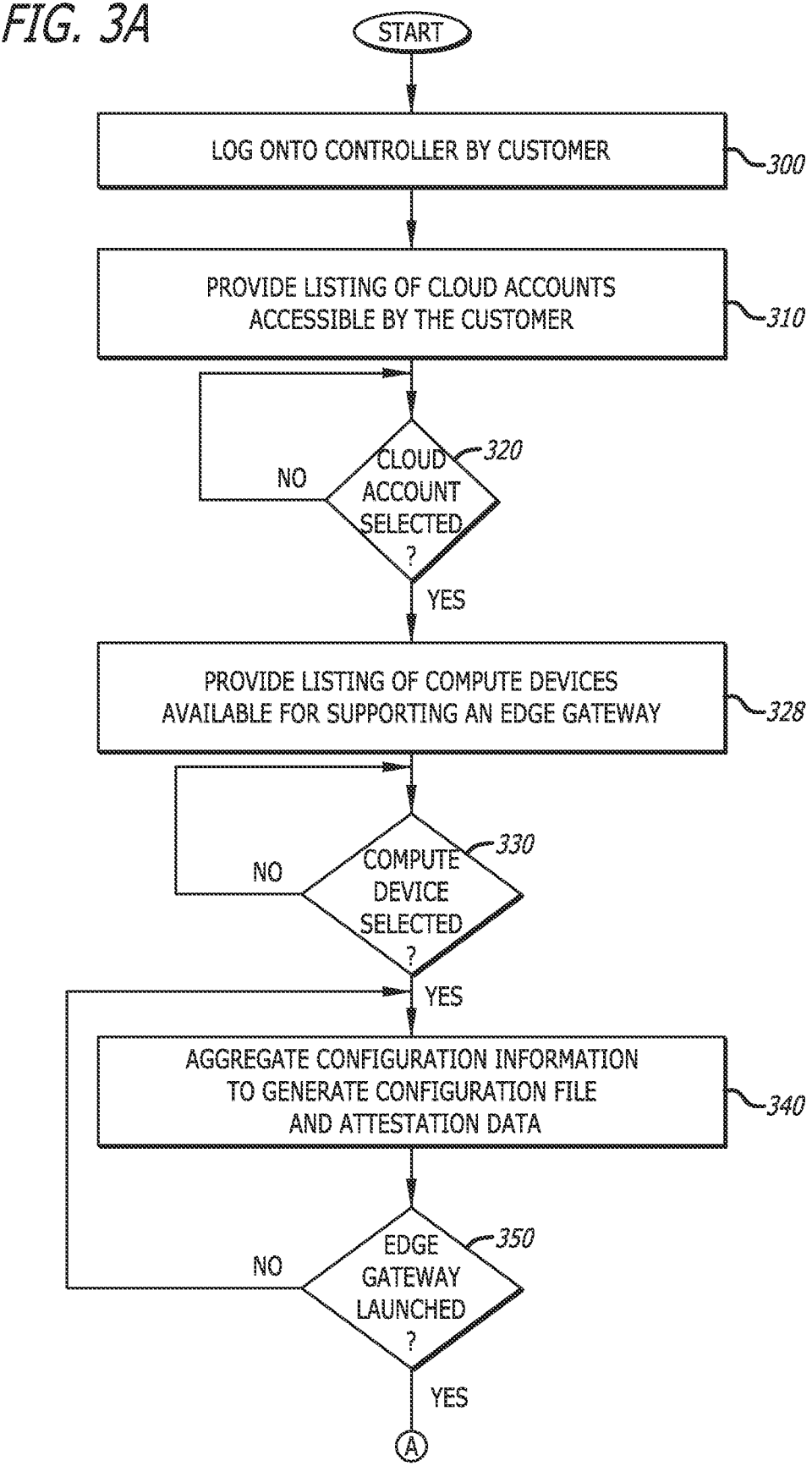
FIGS. 3A-3B is a first exemplary embodiment of a zero-trust orchestration (ZTO) workflow conducted in accordance with communications between the controller and the edge gateway of FIG. 1.
Figure 3B:
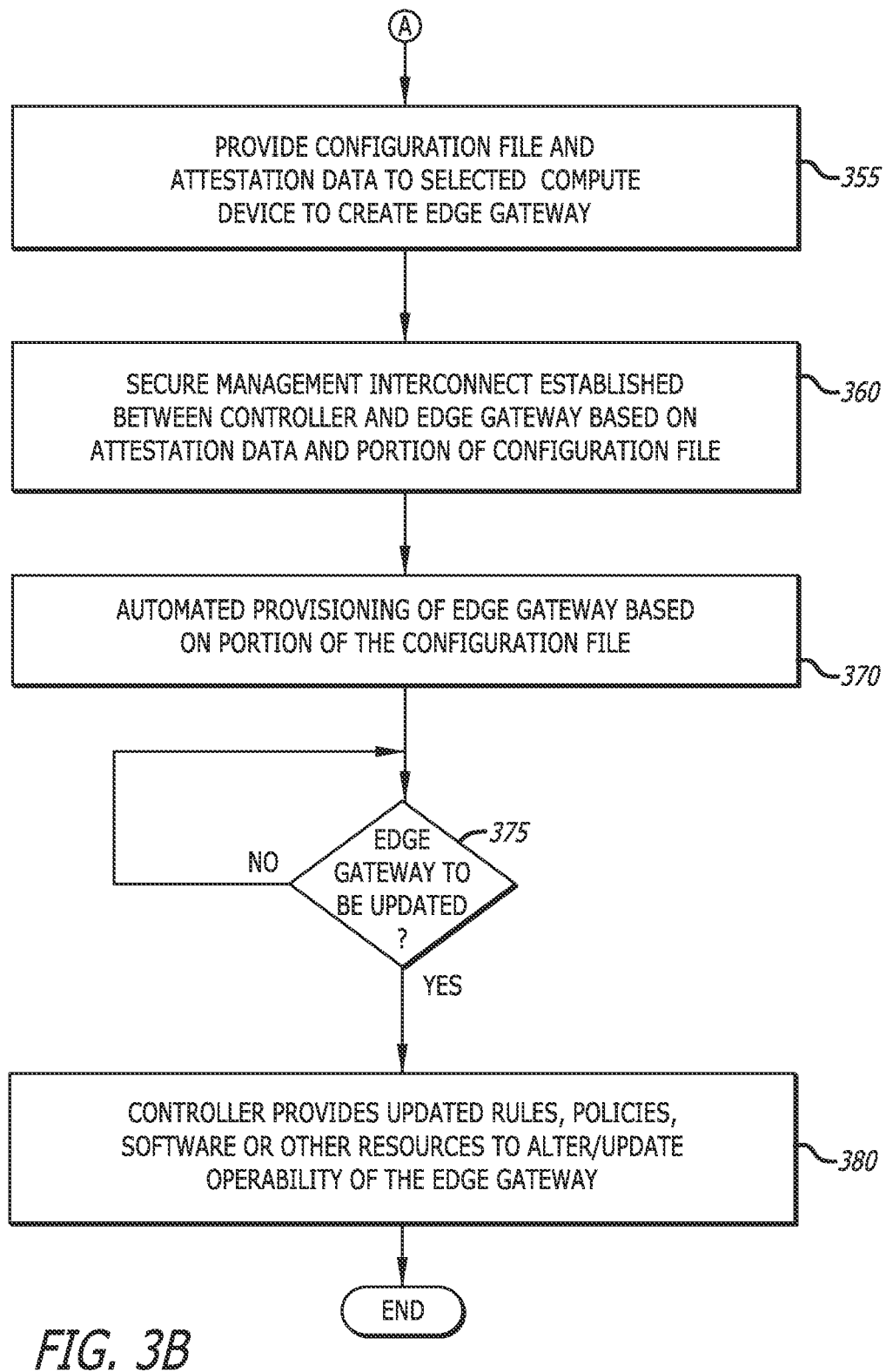

In accordance with a first Zero Trust Orchestration (ZTO) scheme, the controller 180 may be configured to provision the edge gateway 140 subsequent to creation of the secure, management interconnect 185 based on (i) selection of a compute device that is associated with a particular datacenter and (ii) initiation of a launch operation. The launch operation constitutes a process, initiated by the controller 180, to establish a communication session for use in generating the management interconnect 185, and thereafter, configuring the compute device (e.g., installing software, setting parameters, etc.) to create the edge gateway 140. According to one embodiment of the disclosure, upon initiation of the launch operation, the controller 180 provides configuration information 190 (referred to as "cloud-init file") and attestation data 195 (e.g., one-time token, passcode, etc.) to the compute device 142 to commence establishment of the management interconnect 185 through as well as creation and provisioning of the edge gateway 140 as illustrated in FIGS. 2-3 and described below.

In accordance with a second Zero Trust Orchestration (ZTO) scheme, the controller 180 may be configured to generate the management interconnect 185 and create the edge gateway 140 based on launching of the compute device and separately providing the configuration information 190 and the attestation data 195 bundled as a file 197 (e.g., cloud-init file, ISO file, etc.) to the compute device 142. In contrast with the first ZTO scheme, based on access to the controller 180 via a user interface, the user initiates passage of the file 197 to bootstrap the edge gateway 140 to commence creation of the edge gateway 140 and establishment of the management interconnect 185. After establishment of the management interconnect, a bootstrap script operating for the edge gateway 140, requests gateway software and other components from the controller 180 for installation on the edge gateway 140.

Furthermore, the controller 180 is configured to manage a flow of messages between virtual network infrastructures 110/115, including VPCs $112_1$ and/or $112_2$. This message flow management may be based on content loaded within gateway tables (not shown) by the controller 180 via the management interconnect 185, where the gateway tables are deployed within each of the gateways $155_1$-$155_2$ and $160_1$-$160_2$ and manage message flow via the edge gateway 140 based on content provided by the controller 180. The controller 180 may be deployed as virtual logic in the form of a software component (instance) that provides programmatic control over native constructs of one or more public cloud networks based on rule(s) and/or policies made accessible to the edge gateway 140. The controller 180 is executed by a cloud-based compute services (e.g., Elastic Compute Cloud EC2, etc.) that are based on physical processor(s) and memory associated with the public cloud infrastructure.

III. ZTO Scheme—First Embodiment

Referring now to FIG. 2, an exemplary embodiment of an orchestrator platform 200 including the edge gateway 140 of FIG. 1 is shown. As shown, the orchestrator platform 200 includes the edge gateway 140 featuring a first edge (compute) device 210 placed in active mode to operate as the edge gateway 140 and a second edge (compute) device 220 placed into standby mode to operate as a redundant edge gateway. The orchestrator platform 200 is configured based on communications with the controller 180 as shown in FIG. 3.

As shown in FIGS. 2-3, via a portal 230, a customer logs onto the controller 180 (operation 300). Based on customer information 240 (e.g., customer identifier, account name, etc.) suppled to the controller 180 via the portal 230, the customer is provided with a listing of cloud accounts 242 accessible by the customer (operation 310). According to one embodiment of the disclosure, each of the cloud accounts corresponds to a cloud service offered by a particular cloud service provider or network overlay provider. Upon selection of a cloud account communicated to the controller 180 via message 244, a listing of compute devices 246 (e.g., virtual machines) available for supporting the edge gateway 140 may be provided to the customer via the portal 230 (operations 320 and 325). A compute device is selected to host the edge gateway 140 via message 248 (operation 330).

After selection of the compute device, configuration information for the edge gateway 140 is formulated by the controller (operation 340). This formation may be conducted by the customer directly via access to the controller 180 via the portal 230 or may be conducted automatically, without customer assess, via a process operating as part of the controller 180 (e.g., machine-learning process, etc.), The configuration information 190 may include, but is not limited or restricted to a network address assigned to a first controller interface 250 associated with the management interconnect 185, a network address assigned to a second controller interface 260 associated with a local area network (LAN) interconnect 265 that supports communications between the controller 180 and computing devices $120_1$-$120_M$ within the datacenter 130 (see FIG. 1), and a network address assigned to a third controller interface 270 associated with a wide area network (WAN) interconnect 275 that supports communications between the controller 180 and computing devices accessible over a public network (e.g., Internet). The configuration information 190, along with the attestation data 195, is provided to the selected compute device in response to the customer selecting to launch the edge gateway 140 (operations 350 and 355).

As shown, the first edge (compute) device 210, upon receipt of the configuration information 190 and the attestation data 195, reads a portion of the configuration data (e.g., network address associated with the management interconnect 185, attestation data 195 including an OTP, etc.) to establish a communication session between the edge gateway 140 (e.g., first edge (compute) device 210 and/or the second edge (compute) device 220) and the controller 180 (operation 360). The establishment of the communication session may include an exchange of the attestation data 195 and exchange of other data (e.g., digital certificates, etc.) to formulate a secure connection via the management interconnect 185 between the controller 180 and the edge gateway 140. The secure connection may include a mutual transport layer security (mTLS) being a process that establishes an encrypted TLS connection in which both components utilize digital certificates for authentication. Thereafter, software (e.g., a bootstrap script) provided as part of the configuration information 190 initiates requests to the controller 180 for gateway software (instance) and other components to configure the edge gateway 140 (e.g., the first edge device 210), where the edge gateway 140 is registered with the controller 180 and subject to management by the controller 180 (operation 370).

After generating the management interconnect 185 and provisioning the edge gateway 140 (e.g., edge device 210/220), the controller 180 is able to update policies and/or rules to alter functionality of the edge gateway 140 (operations 375 and 380). The altered functionality may include, but is not limited or restricted to the handling of messages provided from computing devices $120_1$-$120_M$ within the datacenter 130.

Referring back to FIG. 2, the first edge device 210 and the second edge device 220 within the orchestrator platform 200 may be configured to establish connectivity with the datacenter 130 via the LAN interconnect 265. This may be accomplished by assigning a network address to the second controller interface 270. Similarly, connectivity outside of the local network may be accomplished by assigning a network address associated with the third controller interface 270 for configuration of the WAN interconnect 275 via router 280. The LAN/WAN interconnects 265/275 enable the orchestrator platform 200 to provide connectivity between the computing devices $120_1$-$120_M$ within the datacenter 130 and cloud services 290 via the spoke VPC 150.

Figure 4:
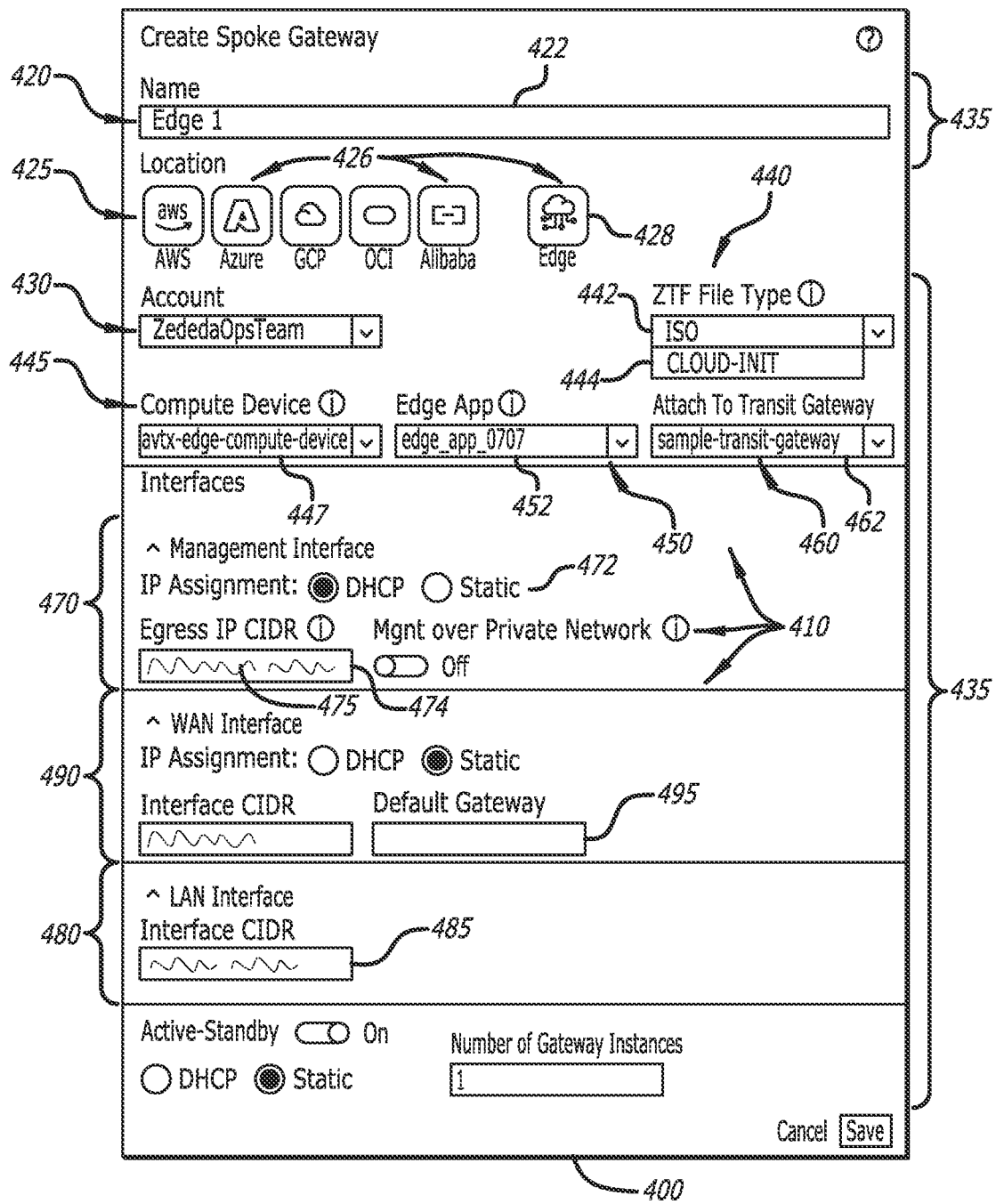
FIG. 4 is an exemplary embodiment of a graphic user interface (GUI) for configuration and launching of the edge gateway.

Referring to FIG. 4, an exemplary embodiment of a graphical user interface 400 of the controller 180 of FIG. 1 (hereinafter, "controller GUI") for configuration and launching of the edge gateway 140 is shown. Herein, the controller GUI 400 features a plurality of input fields 410, which may include, but are not limited or restricted to the following: name field 420, location field 425, account field 430, configuration file type field 440, compute device field 445, edge application field 450, edge transit gateway field 460, management interface field 470, LAN interface field 480, and WAN interface field 490. The fields 410 rendered as part of the controller GUI 400 may be configured as drop-down menus, text fields, selectable display objects, radio buttons, or the like.

As shown in FIG. 4, the name field 420 is provided to receive, as input, an identifier 422 for the edge gateway 140. The identifier 422 may include a name (e.g., series of alphanumeric characters) representing the edge gateway 140. As shown, the identifier 442 is selected as "edge1."

The location field 425 is represented by a plurality of display objects 426 each associated with a cloud account available for creation of the gateway by the customer. These display objects 426 may include one or more display objects 427 associated with each public cloud networks available to the customer as well as a display object 428 directed to an overlay network that, when selected, allows for creation and provisioning of an edge gateway (e.g., edge gateway 140 of FIG. 1). Herein, as shown, the "edge" display object 428, when selected, provides configuration information formulated based on parameters 435 selected for the edge gateway along with the attestation data (e.g., OTP) 195 generated to establish a secure management interconnect with the controller 180.

The configuration file type field 440 is provide to select the file type for delivery of the name 422 of the edge gateway 140 along with configuration information based on content of the parameters 435. As an illustrative example, the configuration file type field 440 may offer one or more configuration file types for selection, including an ISO file 442 or a Cloud-Init file 444. The selected configuration file 442 or 444, during launch, is automatically generated as a container for certain configuration parameters 435 associated with an edge gateway (e.g., edge gateway 140 of FIG. 1), including the name 422, compute device identifier 447, edge application identifier 452 for download, edge transit gateway 462, management interface (network) address 475, LAN interface address 485, and WAN interface address 495. These addresses 475, 485 and/or 495 may be represented as a Classless Inter-Domain Routing (CIDR) to identify different networking addresses associated with different network interfaces supported by the edge gateway 140.

Referring still to FIG. 4, the compute device field 445 is provided to select the identifier 447 for the compute device deployed as part of a selected cloud network to be configured as the edge gateway 140. As shown, the compute device identifier 447, represented as "avtx-edge-compute-device," 447 where the compute device provided as part of the overlay network 105 of FIG. 1, is selected for provisioning as the edge gateway 140.

The edge application field 450 is provided to select an identifier 452 for gateway software, data and/or other components requested for download from the controller 180 for provisioning of the edge gateway 140 after the secure, management interconnect 185 of FIG. 1 is established between the edge gateway 140 and the controller 180. As shown, the edge application field 450 may be implemented as a drop-down menu that allows the customer to select different software (e.g., applications(s), packages representing a collection of executable software, etc.), where the listed software may be based on characteristics of the consumer such as a subscription level, customer size, industry of the customer, location of the customer, or the like.

The edge transit gateway field 460 is provided to select a transit gateway operating as a termination point for the direct interconnect 170 established between the edge gateway 140 and the selected transit gateway. As shown in FIG. 4, the transit gateway identifier 462, namely the "sample-transit gateway," is selected as the transit gateway for the edge gateway 140.

Lastly, the management interface field 470 includes a first entry 472 for selection of dynamic network address allocation or static network address allocation and/or a second entry 474 for insertion of the management interface (network) address 475. Similar field assignments are provided as part of the LAN interface address 485, and/or the WAN interface address 495. These addresses 475, 485 and/or 495 may be represented as a Classless Inter-Domain Routing (CIDR) to identify different networking addresses associated with different network interfaces supported by the edge gateway 140.

IV. ZTO Scheme—Second Embodiment

Figure 5:
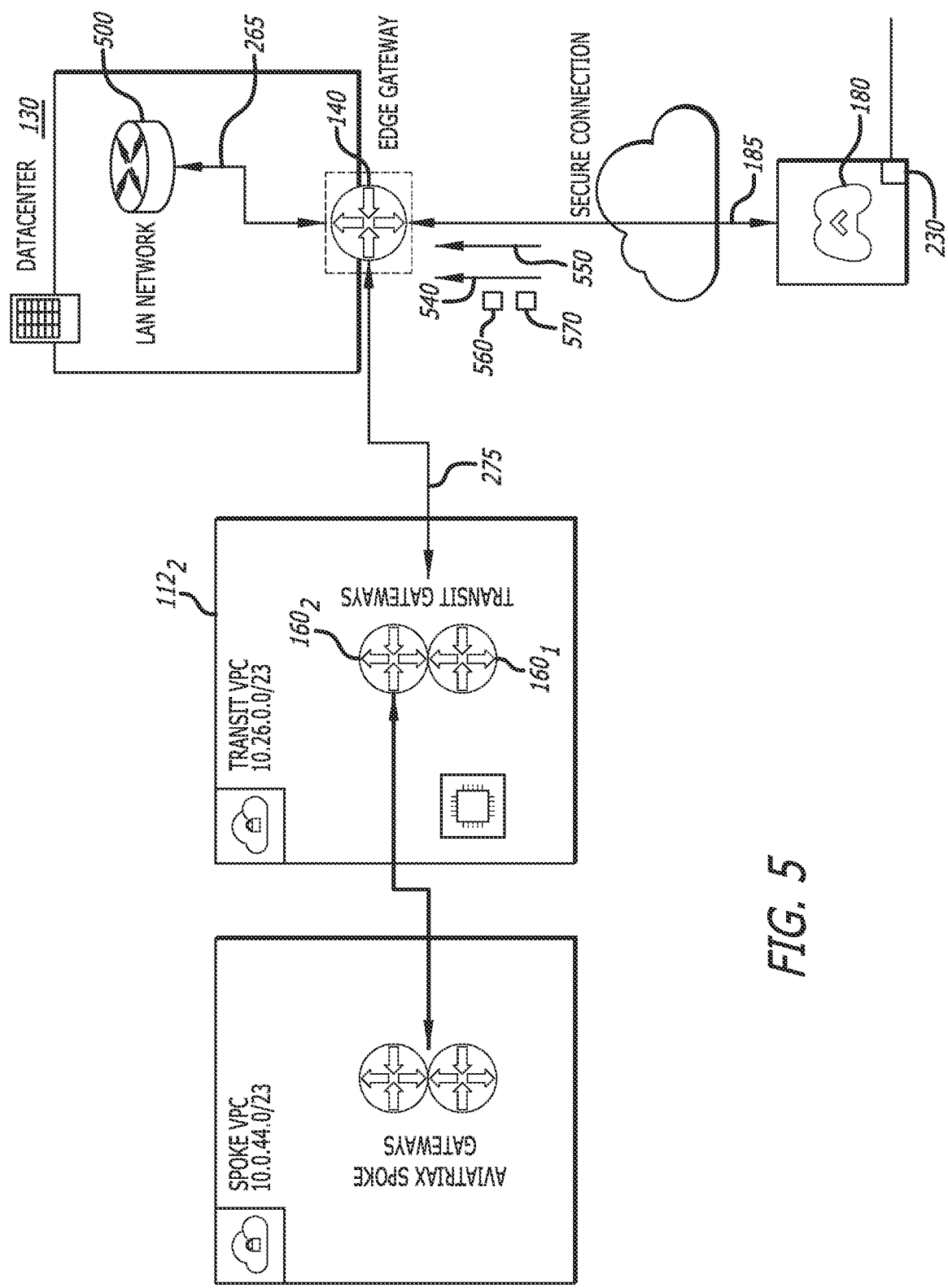
FIG. 5 is an exemplary embodiment of the edge gateway deployed as an interface to the datacenter.

Referring now to FIG. 5, an exemplary embodiment of the edge gateway 140 deployed as an interface to the datacenter 130 is shown. Herein the edge gateway 140 is deployed as part of the datacenter 130, which is communicatively coupled to the management interconnect 185. The edge gateway 140 is further coupled to a private network 500 of the datacenter 130 via the LAN interconnect 265 and a transit gateway $160_1$-$160_2$ of the transit VPC $112_2$ via the WAN interconnect 275. The creation, configuration and updating of the operability of the edge gateway 140 is conducted by the controller 180 via the management interconnect 185. Thereafter, the edge gateway 140 may be configured to operate as a programmable interface for the datacenter 130, with security measures being conducted in accordance with rules and/or policies configured for one or more software applications loaded into the edge gateway 140. The software applications control operability of the edge gateway 140.

Figure 6A:
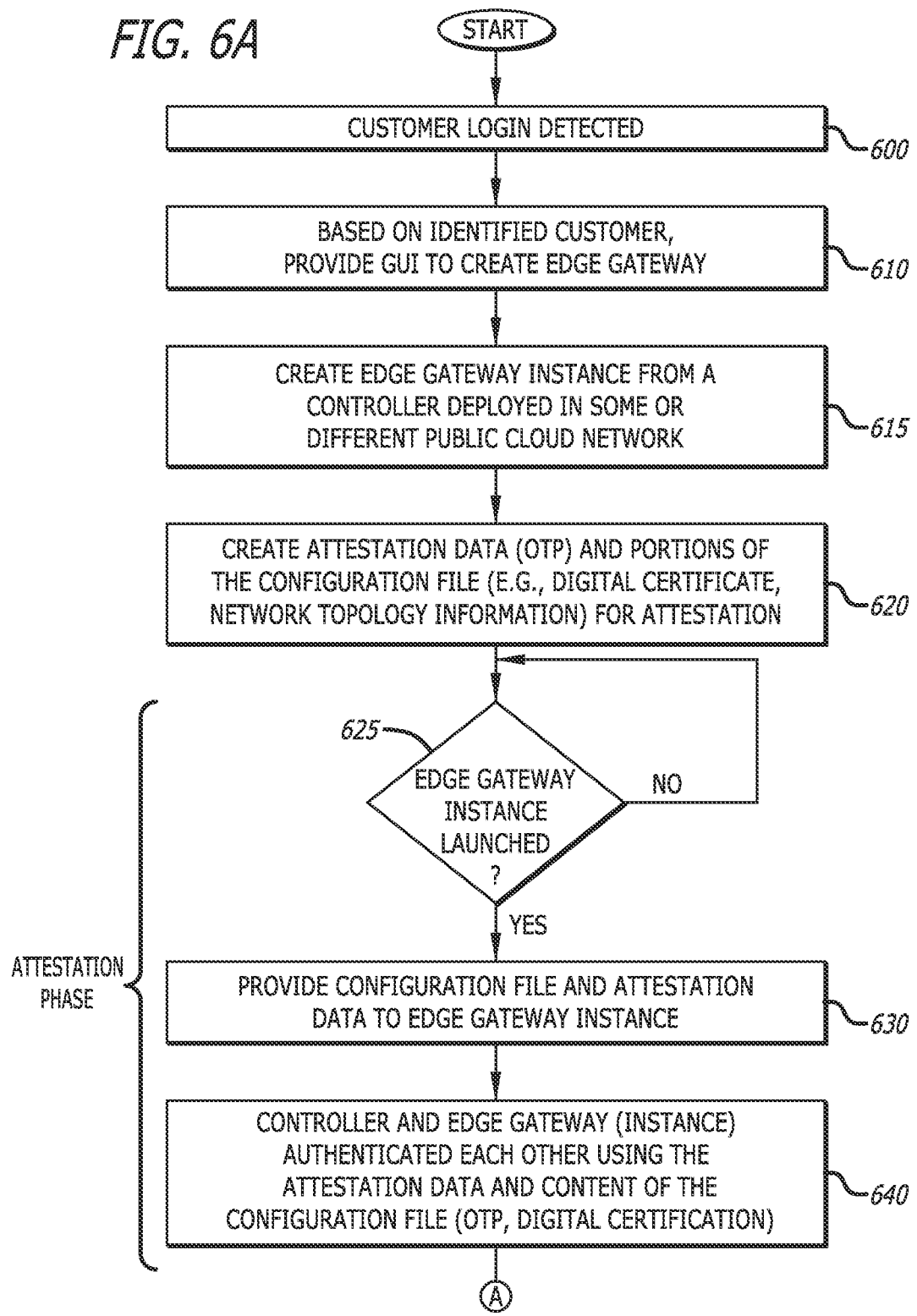
FIGS. 6A-6B is a second exemplary embodiment of a zero-trust orchestration (ZTO) workflow conducted in accordance with communications between the controller and the edge gateway of FIG. 5.
Figure 6B:
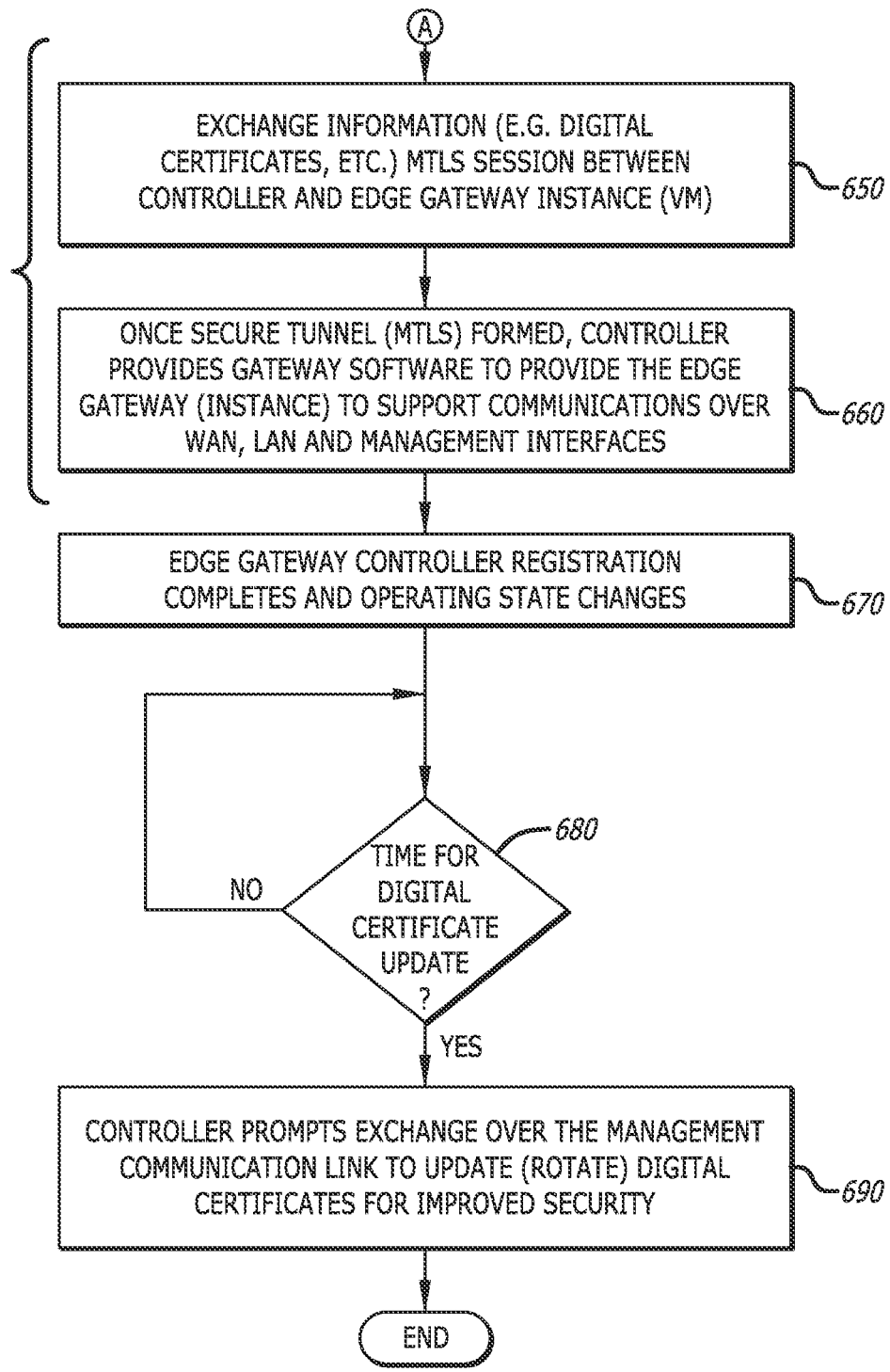

As shown in FIGS. 5, 6A & 6B, via the portal 230, the customer logs onto the controller 180 (operation 600). Based on customer information (e.g., customer identifier, account name, etc.) suppled to the controller 180 via the portal 230, the controller 180 is configured to provide a graphical user interface (GUI) for creation of an edge gateway (operations 610 and 615). According to one embodiment of the disclosure, a compute device within a virtual environment of the datacenter is configured to operate as the edge gateway. For example, during creation, a listing of compute devices (e.g., virtual machines) available for supporting the edge gateway 140 may be provided to the customer via the portal for the controller. A compute device is selected to host the edge gateway 140. Alternatively, the compute device may be selected upon based on availability (e.g., round-robin scheme, customer location, etc.).

Figure 7:
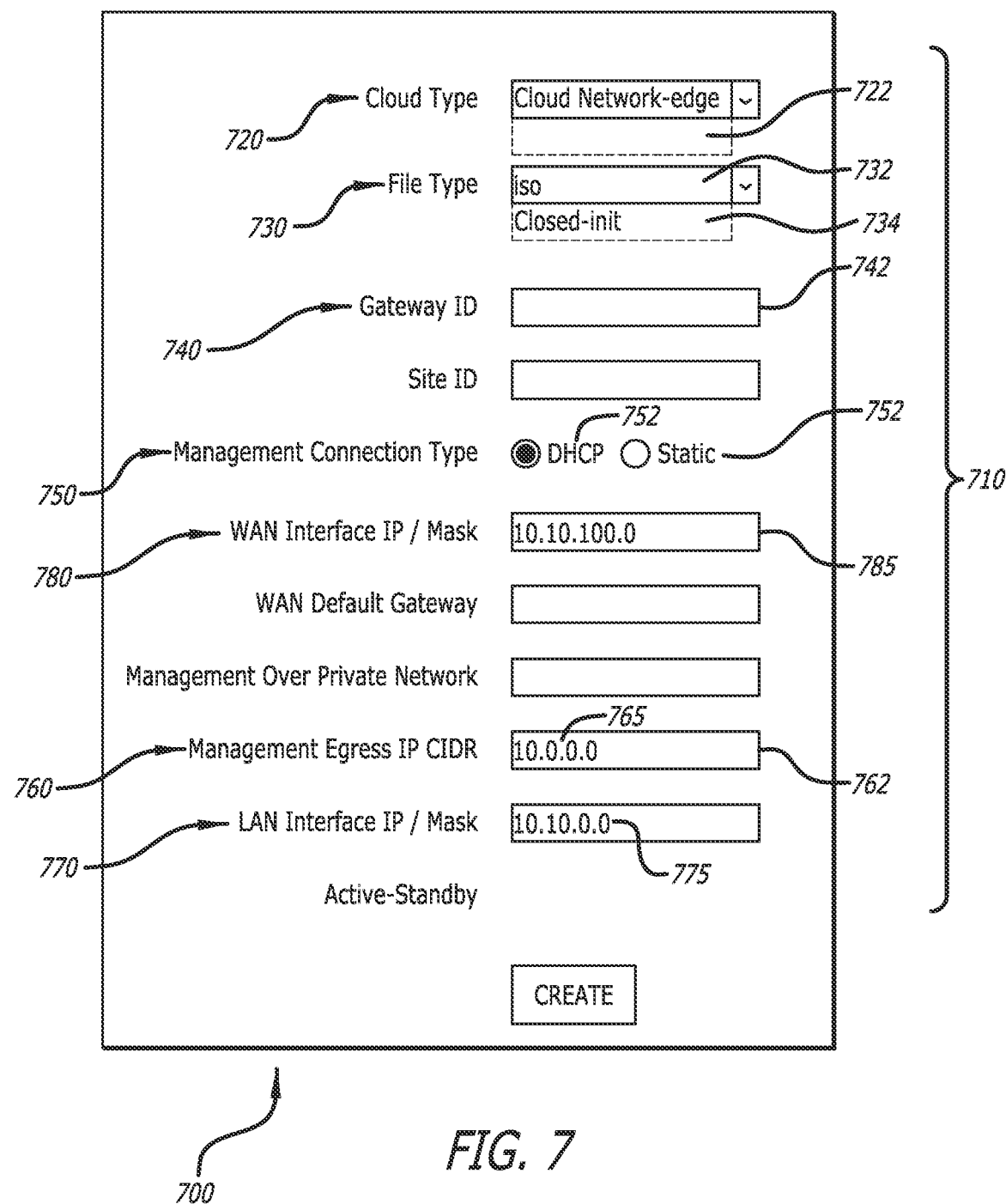
FIG. 7 is an exemplary embodiment of an user interface provided the controller for configuration and launching of the edge gateway.

After creation of the edge gateway, a configuration file 540 is created and provided with attestation data 550 to the edge gateway 140 (operation 620). The configuration file 540 may include, but is not limited or restricted to digital certificate 560 and network topology information 570. During the attestation phase, the attestation data 550 (e.g., an OTP such as one-time token, passcode, etc.) is provided to the edge gateway 140 for establishing a secure communication session with the controller 180 over the management interconnect 185. In particular, the attestation data 550 and the digital certificates 560 are provided for verification and authentication of the edge gateway 140. The network topology information 570 is used for establishment of the interconnects 185, 265 and 275, where an user interface 700 provided by the controller 180 for supplying the network topology information 570 is shown in FIG. 7.

Referring now FIG. 7, an exemplary embodiment of the user interface 700 provided the controller 180 (hereinafter, "controller GUI") for configuration and launching of the edge gateway 140 is shown. Similar to the controller GUI 400 of FIG. 4, the controller GUI 700 features a plurality of input fields 710, which may include, but are not limited or restricted to the following: cloud type field 720, configuration file type field 730, gateway identifier field 740, management connection type field 750, management interface address field 760, LAN interface address field 770, and WAN interface field 780. The fields 710 rendered as part of the controller GUI 700 may be configured as drop-down menus, text fields, selectable display objects, radio buttons, or the like.

The cloud type field 720 is represented by a drop-down menu that identifies cloud networks to which the customer has an account and is able to create gateways that are part of the overlay network, including edge gateways. Herein, as shown, the "cloud network—edge" menu entry 722, when selected, identifies creation of an edge gateway and is included as part of the configuration file 540 inclusive of selected parameters within some or all of the fields 710. The attestation data (e.g., OTP) 550 may be generated in response to generation of the configuration file 540.

The configuration file type field 730 is provide to select the file type for delivery of a gateway identifier 742 included as part of the gateway identifier field 740 along with network address (e.g., CIDRs) representing selected addresses or address ranges assigned to the edge gateway operating as a termination point for the management interconnect 185, the LAN interconnect 265, and/or the WAN interconnect 275 of FIG. 2. As an illustrative example, the configuration file type field 730 may include an ISO file 732 or a Cloud-Init file 734. The selected configuration file 732 or 734, during launch, is automatically generated as a container for certain configuration parameters associated with an edge gateway (e.g., edge gateway 140 of FIG. 1), including the gateway identifier 742, management interface (network) address 765, LAN interface address 775, and WAN interface address 785.

More specifically, the management connection type field 750 includes an entry 752 for selection whether the network address is dynamically allocated or is static in nature. The management interface address field 760 includes an entry 754 for insertion of the management interface (network) address 765. Similar field assignments are provided as part of the LAN interface address 775, and/or the WAN interface address 785. These addresses 765, 775 and/or 785 may include a CIDR or other addressing parameter to identify different networking addresses associated with the different network interfaces supported by the edge gateway 140.

Referring back to FIGS. 5, 6A & 6B, once the edge gateway is launched (operation 625), the configuration file 540 and the attestation data 550 are provided to the newly created edge gateway 140 (operation 630). The controller 180 and the edge gateway 140 authenticate each other using the attestation data 550 returned to the controller 180 from the edge gateway 140 and certain contents of the configuration file 540, namely the digital certificates 560. This authentication occurs prior to establishment of a secure communication session (e.g., mTLS session) between the controller 180 and the edge gateway 140 (operations 640 & 650).

Once the secure communication session is established, the controller provides gateway software (e.g., application(s) and/or other components) to provision the edge gateway 140 to support communications via the management interconnect 185, LAN interconnect 265 and the WAN interconnect 275 (operation 660). As the edge gateway completes registration, an operating state assigned to the edge gateway 140 changes from a "standby" mode to an "active" mode (operation 670).

For increased security, the digital certificates may be updated. In response to an event (e.g., periodic time elapsed, prompt by system administrator, etc.), the controller 180 prompts the exchange of the digital certificates over the management interconnect 185 (operations 680 and 690). This "rotation" of the digital certificates enable the communication session to be maintained.

V. Edge Gateway—Logical Representation

Figure 8:
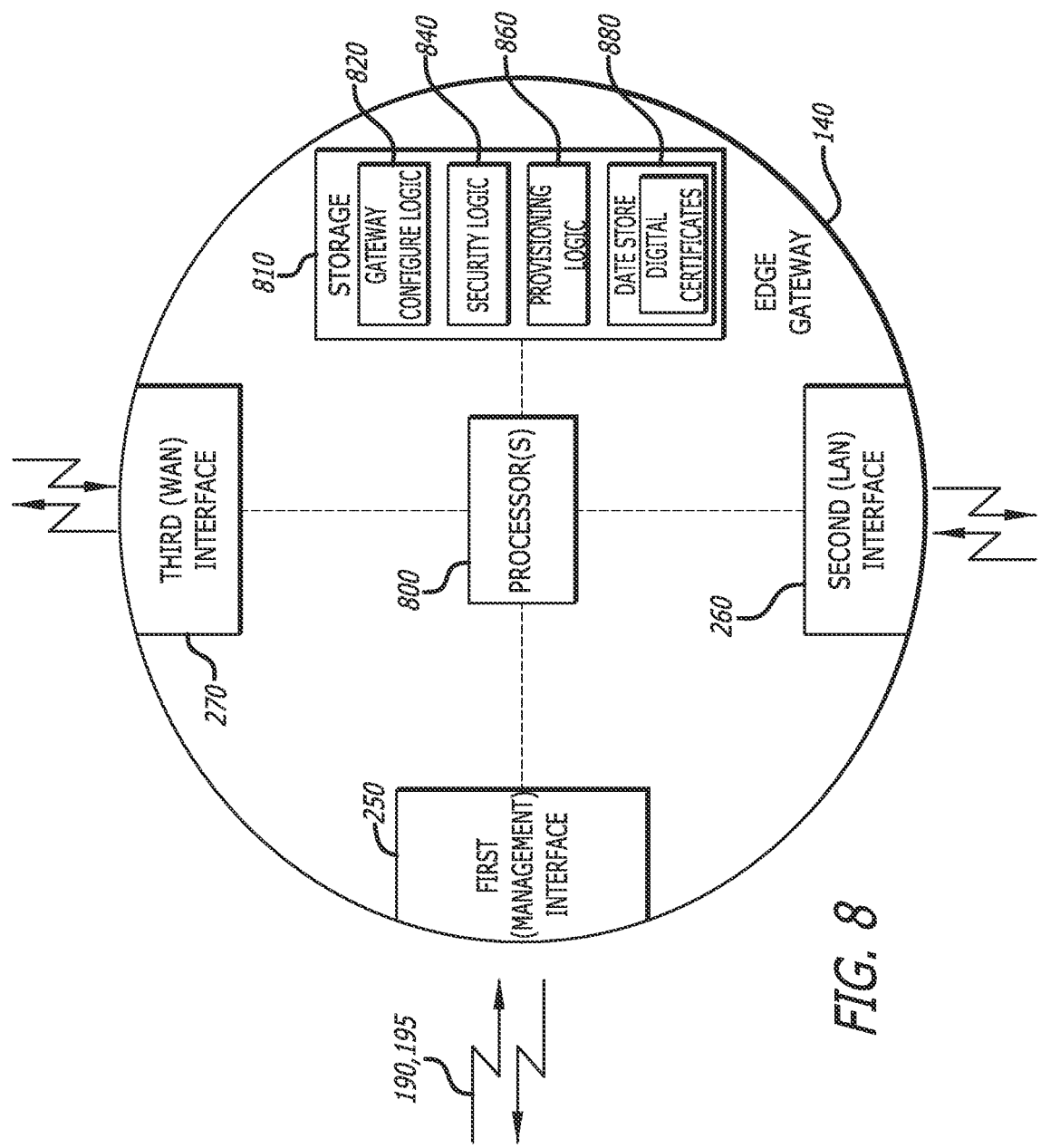
FIG. 8 is an exemplary embodiment of a logical representation of the edge gateway of FIGS. 1 & 5.

Referring now to FIG. 8, an exemplary embodiment of a logical representation of the edge gateway 140 of FIG. 1 is shown. Herein, the edge gateway 140 is adapted with three interfaces, namely the first (management) interface 250 associated with the management interconnect 185, the second (LAN) interface 260 associated with the LAN interconnect 265, and the third (WAN) interface 270 associated with the WAN interconnect 275. A processor 800 is configured to receive information via the interfaces 250/260/270. Also, the processor 800 is communicatively coupled to a non-transitory storage medium 810. The non-transitory storage medium 810 features gateway configuration logic 820, security logic 840, provisioning logic 860, and a data store 880 for configuration files received from the controller 180 that are processed by the gateway configuration logic 820.

In particular, during creation of the edge gateway 140, the gateway configuration logic 820 receives the configuration file 190 and attestation data 195 from the controller and parses the configuration file 190 for network topology information such as CIDRs for each of the interfaces 250/260/270. The network topology information may be used for creation of an infrastructure associated with the edge gateway 140, including a name assigned to the edge gateway 140 as well as network addresses that operate as termination points for interconnects. More specifically, the network topology information includes a CIDR associated with a management interface 250 that, when processed by the gateway configuration logic 820, provides a termination point for the management interconnect 185. Similarly, the network topology information includes (i) a CIDR associated with a LAN interface 260 that provides a termination point for the LAN interconnect 265 and (ii) a CIDR associated with the WAN interface 270 that provides a termination point for the WAN interconnect 275.

After configuration of the edge gateway 140, the security logic 840 is configured to establish a secure interconnect between the edge gateway 140 and the controller 180 based on the attestation data. More specifically, the edge gateway 140 receives the attestation data (e.g., the OTP) and/or digital certificates 870 being part of the configuration file 190 from the controller 180 and returns the OTP to verify that the edge gateway 140 is a device authorized to communicate with the controller. The digital certificates 870 are maintained within the data store 880 of the edge gateway 140 for proving the authenticity of communications from the controller 180. The attestation is relied upon to establish a secure communication session (mTLS session) between the controller and the edge gateway 140.

After establishing the secure management interconnect 185 that supports the secure communication session with the controller, the provisioning logic 860 is configured to initiate a request to the controller 180 for edge gateway software that, when executed by the processor 800, provides the edge gateway 140 with its desired functionality. The edge gateway software may be identified in the configuration file 190 provided from the controller 180 to the edge gateway 140, where the edge gateway 140 may initiate a download of the edge gateway software once the configuration process has completed.

Embodiments of the invention may be embodied in other specific forms without departing from the spirit of the present disclosure. The described embodiments are to be considered in all respects only as illustrative, not restrictive. The scope of the embodiments is, therefore, indicated by the appended claims rather than by the foregoing description. All changes that come within the meaning and range of equivalency of the claims are to be embraced within their scope.

What is claimed is:

1. An overlay network interconnecting a first public cloud network with an on-premises network, comprising:
 a non-transitory storage medium comprising a controller deployed within a cloud computing platform; and
 an edge gateway communicatively coupled to the controller, the edge gateway is configured to:
  receive a configuration file and attestation data from a controller, the configuration file comprising:
   a first network address assigned to a first controller interface associated with a secure interconnect,
   a second network address assigned to a second controller interface associated with a local area network (LAN) interconnect that supports communications between the controller and computing devices of a datacenter, and
   a third network address assigned to a third controller interface associated with a wide area network (WAN) interconnect that supports communications between the controller and computing devices accessible over a public network,
  analyze the configuration file to obtain at least a first network address being used as an interface for secure communications with the controller,
  establish the secure interconnect with the controller based on the attestation data and the digital certificate of the configuration file, and
  conduct a provisioning operation to initiate a request to the controller for edge gateway software thereby facilitating automated provisioning of the edge gateway without human intervention.

2. The overlay network of claim 1, wherein the edge gateway is an instance operating on an on-premises network and is configured to establish communications with cloud components associated with the overlay network.

3. The overlay network of claim 2, wherein the edge gateway is communicatively coupled to a first transit virtual private cloud network of a first public cloud network provided by a first cloud service provider, the first transit private cloud network is configured for communicatively coupling to a second transit virtual private cloud network being part of a second public cloud network provided by a second cloud service provider different from the first cloud service provider.

4. The overlay network of claim 1, wherein the edge gateway analyzes the configuration file by at least parsing the configuration file for network topology information for use in provisioning an interface configuration of the edge gateway.

5. The overlay network of claim 4, wherein the network topology information includes a plurality of Classless Inter-Domain Routings (CIDRs) each uniquely associated with an interface supported by the edge gateway.

6. The overlay network of claim 5, wherein the plurality of CIDRs include (1) a first CIDR associated with a management interface for communicative coupling to the connector, (2) a second CIDR associated with a Local Area Network (LAN) interface, and (3) a third CIDR associated with a Wide Area Network (WAN) interface.

7. The overlay network of claim 1, wherein the edge gateway is configured to control a propagation of data between a transit gateway of a transit virtual private cloud network deployed within a first public cloud network and one or more computing devices deployed within the on-premises network.

8. A non-transitory storage medium operating as an edge gateway instance, comprising:
 gateway configuration logic configured to receive a configuration file comprising:
  a first network address assigned to a first controller interface associated with a secure interconnect,
  a second network address assigned to a second controller interface associated with a local area network (LAN) interconnect that supports communications between the controller and computing devices of a datacenter, and
  a third network address assigned to a third controller interface associated with a wide area network (WAN) interconnect that supports communications between the controller and computing devices accessible over a public network,
 security logic configured to establish the secure interconnect from the edge gateway with the controller based on the attestation data and the digital certificate of the configuration file; and provisioning logic configured to initiate a request to the controller for edge gateway software for automated provisioning of the edge gateway.

9. The non-transitory storage medium of claim 8, wherein the edge gateway is an instance operating on an on-premises network that establishes communications with an overlay network.

10. The non-transitory storage medium of claim 8, wherein the overlay network enables connectivity between at least a first public cloud network provided by a first cloud service provider and a second public cloud network provided by a second cloud service provider different from the first cloud service provider.

11. The non-transitory storage medium of claim 8, wherein the analysis of the configuration file by the gateway configuration logic comprises parsing the configuration file for network topology information.

12. The non-transitory storage medium of claim 11, wherein the network topology information includes a Classless Inter-Domain Routing (CIDR) for each interface supported by the edge gateway.

13. The non-transitory storage medium of claim 12, wherein the CIDRs associated with each interface of a plurality of interfaces supported by the edge gateway instance include (1) a first CIDR associated with a management interface, (2) a second CIDR associated with a Local Area Network (LAN) interface, and (3) a third CIDR associated with a Wide Area Network (WAN) interface.

14. The non-transitory storage medium of claim 8, wherein the security logic to establish a secure interconnect to the controller based on the attestation data.

15. The non-transitory storage medium of claim 14, wherein the attestation data includes an one-time token (OTP).

16. The non-transitory storage medium of claim 8, wherein the provisioning logic is configured to initiate the request to the controller for edge gateway software after establishment of a secure communication session between the controller and the edge gateway through use of the attestation data.

17. An edge gateway implemented by a computer processing unit (CPU) coupled to a memory, the edge gateway comprising:
gateway configuration logic deployed within a cloud computing platform and maintained within a non-transitory storage medium and configured to receive attestation data and a configuration file comprising:
a first network address assigned to a first controller interface associated with a secure interconnect,
a second network address assigned to a second controller interface associated with a local area network (LAN) interconnect that supports communications between the controller and computing devices of a datacenter, and
a third network address assigned to a third controller interface associated with a wide area network (WAN) interconnect that supports communications between the controller and computing devices accessible over a public network,
security logic configured to establish the secure interconnect with the controller based on the attestation data and the digital certificate of the configuration file; and
provisioning logic configured to initiate a request to the controller for edge gateway software for automated provisioning of the edge gateway.

18. The edge gateway of claim 17 being an instance operating on an on-premises network that establishes communications with an overlay network.

19. The edge gateway of claim 17 being deployed as part of an overlay network that establishes connectivity between at least a first public cloud network provided by a first cloud service provider and a second public cloud network provided by a second cloud service provider different from the first cloud service provider.

20. The edge gateway of claim 17, wherein the gateway configuration logic conduct the analysis of the configuration file by at least parsing the configuration file for network topology information.

21. The edge gateway of claim 20, wherein the network topology information includes a plurality of Classless Inter-Domain Routings (CIDRs) with each CIDR associated with an interface that enables data to be transmitted from a source external from the edge gateway.

22. The edge gateway of claim 21, wherein the plurality of CIDRs include (1) a first CIDR associated with a management interface, (2) a second CIDR associated with a Local Area Network (LAN) interface, and (3) a third CIDR associated with a Wide Area Network (WAN) interface.

23. The edge gateway of claim 17, wherein the security logic to establish a secure interconnect to the controller based on the attestation data.

24. The edge gateway of claim 23, wherein the attestation data includes an one-time token (OTP).

25. The edge gateway of claim 17, wherein the provisioning logic is configured to initiate the request to the controller for edge gateway software after establishment of a secure communication session between the controller and the edge gateway through use of the attestation data.

26. A computerized method comprising:
receiving a configuration file and attestation data from a controller, the configuration file comprising:
a first network address assigned to a first controller interface associated with a secure interconnect,
a second network address assigned to a second controller interface associated with a local area network (LAN) interconnect that supports communications between the controller and computing devices of a datacenter, and
a third network address assigned to a third controller interface associated with a wide area network (WAN) interconnect that supports communications between the controller and computing devices accessible over a public network,
conducting analytics on the configuration file to obtain at least a first network address, wherein the first network address being used as an interface for secure communications with the controller;
establishing the secure interconnect from the edge gateway with the controller based on the attestation data and the digital certificate of the configuration file; and
initiating a request from the edge gateway to the controller for edge gateway software so to as automate provisioning of the edge gateway.

* * * * *